(12) United States Patent
  Feddes

(10) Patent No.: US 11,026,411 B2
(45) Date of Patent: Jun. 8, 2021

(54) SHAPE SHIFTING FISHING LURE

(71) Applicant: Scott Feddes, Belgrade, MT (US)

(72) Inventor: Scott Feddes, Belgrade, MT (US)

( * ) Notice: Subject to any disclaimer, the term of this patent is extended or adjusted under 35 U.S.C. 154(b) by 0 days.

(21) Appl. No.: 16/155,432

(22) Filed: Oct. 9, 2018

(65) Prior Publication Data
  US 2019/0116769 A1    Apr. 25, 2019

Related U.S. Application Data

(60) Provisional application No. 62/574,309, filed on Oct. 19, 2017.

(51) Int. Cl.
  *A01K 85/00*    (2006.01)
  *A01K 85/10*    (2006.01)

(52) U.S. Cl.
  CPC .............. *A01K 85/10* (2013.01); *A01K 85/00* (2013.01)

(58) Field of Classification Search
  CPC ......... A01K 85/00; A01K 85/10; A01K 85/12
  USPC ..... 43/42, 42.03, 42.11, 42.12, 42.14, 42.15, 43/42.16, 42.17, 42.18, 42.19, 42.2, 43/42.21, 42.24, 42.26, 42.28, 42.29; D22/125–127, 129–133
  See application file for complete search history.

(56) References Cited

U.S. PATENT DOCUMENTS

| | | | | |
|---|---|---|---|---|
| 1,617,318 A | * | 2/1927 | Brown .................... | A01K 85/12 43/42.2 |
| 2,493,431 A | * | 1/1950 | Wold ..................... | A01K 85/12 43/42.2 |
| 3,245,171 A | * | 4/1966 | Henry .................... | A01K 85/00 43/42.1 |
| 3,964,203 A | * | 6/1976 | Williams, Jr. ......... | A01K 85/14 43/42.02 |
| 7,874,094 B2 | * | 1/2011 | Brevig ................... | A01K 85/12 43/42.2 |

* cited by examiner

*Primary Examiner* — Darren W Ark
*Assistant Examiner* — Steven J Shur

(57) ABSTRACT

A thin material that is in a single planar which has a front and back and is circular in shape. There is a radius in the periphery that travels from the periphery inward, creating a cut that is interior to the peripheral edge and follows the circumference of the circular shape. Where this cut ends there is an opening or change in its direction. A fishing line passes through a hole in the material that is interior to the cut. When the device is in use being pulled through the water, the material between the interior cut and the device's peripheral edge deflects back causing the device to rotate which creates the needed action and flash to attract the fish. This planar deflection is not permanent and the material will return to its single planar when at rest.

1 Claim, 2 Drawing Sheets

SHAPE SHIFTING FISHING LURE

CROSS-REFERENCE TO RELATED APPLICATIONS

This application claims the benefits of U.S. Provisional Application No. 62/574,309, filed Oct. 19, 2017 the disclosures of which are hereby incorporated by reference in their entirety including all figures, tables and drawings.

STATEMENT REGARDING FEDERALLY SPONSORED RESEARCH OR DEVELOPMENT

Not applicable.

THE NAMES OF THE PARTIES TO A JOINT RESEARCH AGREEMENT

Not applicable.

REFERENCE TO SEQUENCE LISTING, A TABLE, OR A COMPUTER PROGRAM LISTING COMPACT DISC APPENDIX

Not applicable.

BACKGROUND OF THE INVENTION

Fish can become accustomed to the same fishing lures making them difficult for a fisherman to catch. There are many different types of fishing lures which create differing amounts of action and flash to attract a fish to bite. Typically a lure uses a spinner blade to create this action. The rigidness of the spinner blade produces resistance while being pulled through the water, causing it to rotate. This rotation is what creates the desired action and flash. The shape and design of the spinner blade greatly affects the function of the lure at different speeds in the water. The fisherman is then aided in his quest by having many different spinner blade options available to present to the target fish increasing the odds of success.

A need remains for a means of creating the rotation, flash and action needed for a fishing lure to attract fish at a variety of speeds when being pulled through the water.

All patents, patent applications, provisional patent applications and publications referred to or cited herein, are incorporated by reference in their entirety to the extent they are not inconsistent with the teachings of the specification.

BRIEF SUMMARY OF THE INVENTION

The device of the subject invention includes a thin flat sheet dial is circular in shape and has a radius that starts from the peripheral edge of the device and travels inward creating a cut that follows the circumference of the circular shape a set distance from the peripheral edge. This cut travels in a direction that follows the circular shape and if the cut were to continue, it would spiral to the middle of the device. However, the cut ends before it reaches the middle. At the end of this cut is an opening, radius or short change of direction of cut. A hole is positioned in the device interior to the cut and its peripheral edge. This hole is large enough to allow for a fishing line or wire to pass through it.

The device of the subject invention can be used in a method of fishing where a hook(s) is tied to a fishing line. A spacer (typically a plastic bead) is positioned on the line, in front of the hook(s). The device of the subject invention is then positioned on the line with the fishing line running through the interior hole in the device. The device of the subject invention rests in front of the spacer and hook(s). This apparatus is then pulled through the water at a variety of speeds and depths to attract fish. While being pulled through the water, the resistance of the water causes the device of the subject invention to be pushed against the spacer. This resistance of the water also causes the portion of the device that is between the cut and its peripheral edge to deflect back. This planar deflection causes the device to rotate around me fishing line creating the desired action and flash.

DETAILED DESCRIPTION OF THE INVENTION

Figure 1:
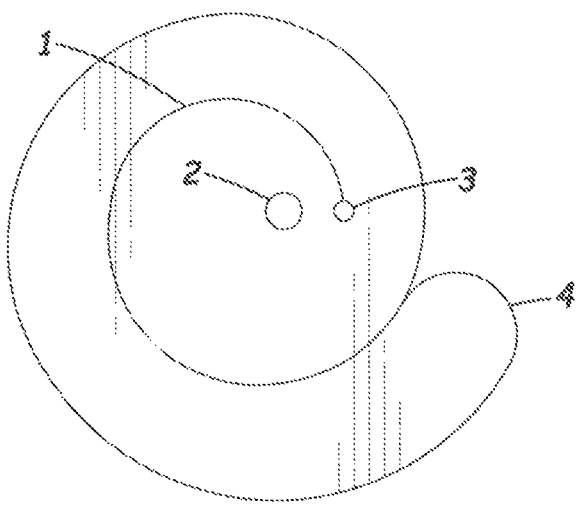
FIG. 1 is a front view of the present invention showing the circular shape, a radius cut and an interior hole
Figure 2:
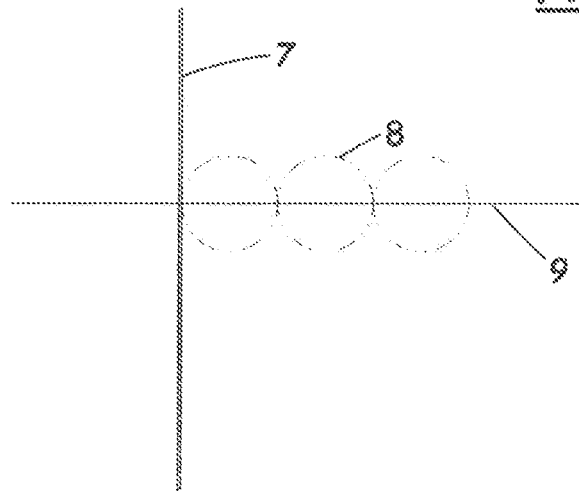
FIG. 2 is a side view of the present invention showing the planar of the device when at rest.
Figure 3:
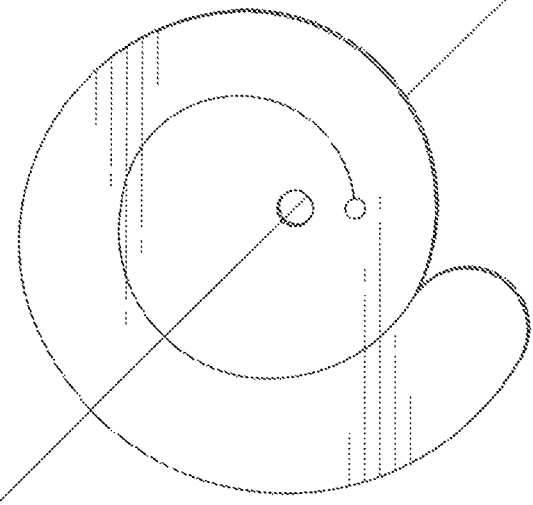
FIG. 3 is a upper perspective view of the present invention showing the planar device installed on a fishing line.

The device of the subject invention is constructed of a thin film configured in a circular shape (FIG. 1) with a radius in the periphery 4 which is the start of an interior cut. This cut 1 follows the circumference of the circulars shape a set distance 5b from the peripheral edge and ends at a point that is Interior to the peripheral edge of the circular shape. In this preferred embodiment the cut ends about 360 degrees from its beginning. At the ending point of the cut there is an opening 3. Interior to the peripheral edge of the device is a hole 2 that is large enough to allow fishing line 9 or wire to pass through. In this preferred embodiment, the hole is not centered in the device.

Figure 4:
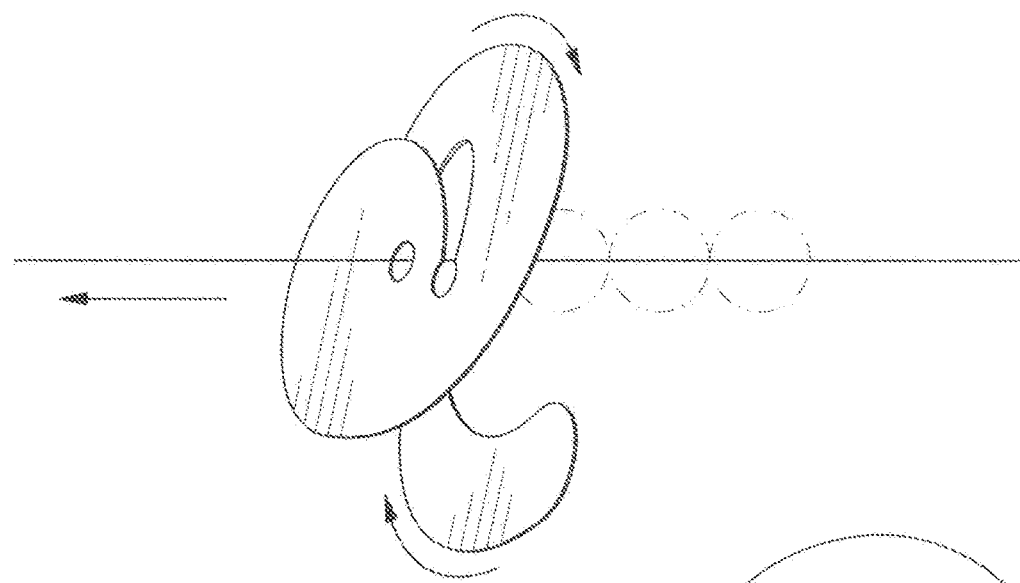
FIG. 4 is side view of the present invention as it is pulled through the water showing the deviation in its planar.
Figure 6:
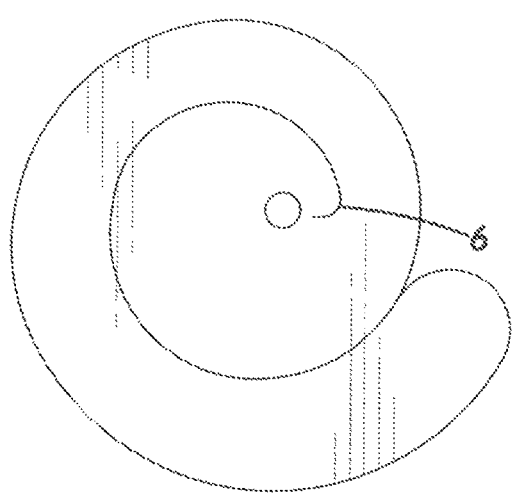
FIG. 6 is a front view of an alternative embodiment of the present invention showing a change in direction at the end of the cut.
Figure 5:
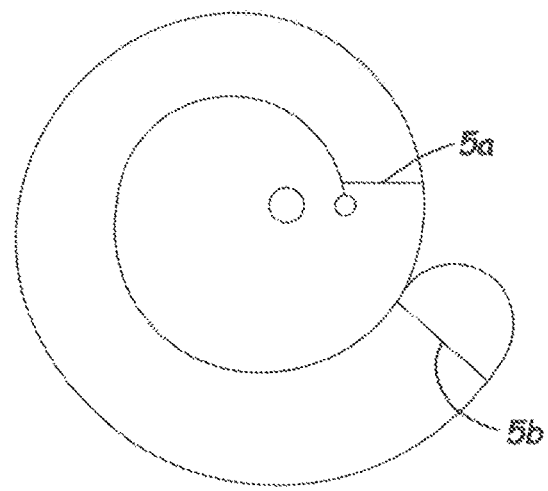
FIG. 5 is a front view of the present invention showing a set distance the cut line travels around the circumference of the circular shape ending at a point interior to its peripheral edge.

The device of the subject invention is a thin plastic film typically in a circular shape being clear or with colored reflective markings or stickers. In this preferred embodiment, the material 7 is of the thickness and make to allow for deflection. This deflection is a change in the linear planar of the device and this planar deflection is created when the device is pulled through the water. However, the device material is rigid enough to return close to its original planar when at rest or when removed from the water. The device can be made of a number of materials. In this preferred embodiment a plastic material provides a water resistant, semiflexible state. Furthermore, the material and configuration needs to allow for the device to deflect (FIG. 4) while being pulled through the water yet return to its original planar when at rest. The material used can be clear or contain color that creates a reflective pattern, image or glow.

The device is a circular shape (FIG. 1) with a radius in the periphery 4 creating a cut 1 that travels along the circumference of the shape, interior to its peripheral edge. This cut is a set distance 5b from the peripheral edge of the circular shape and ends a set distance 5a from the beginning. This cut if not ended, would spiral to the center of the circular shape. In this preferred embodiment at the end of the cut is an opening 3 or change in cut direction 6. In another preferred embodiment there can be a very short change in direction 6 of the cut. In this preferred embodiment, the change in direction of the cut is towards the center of the device.

Figure 7:
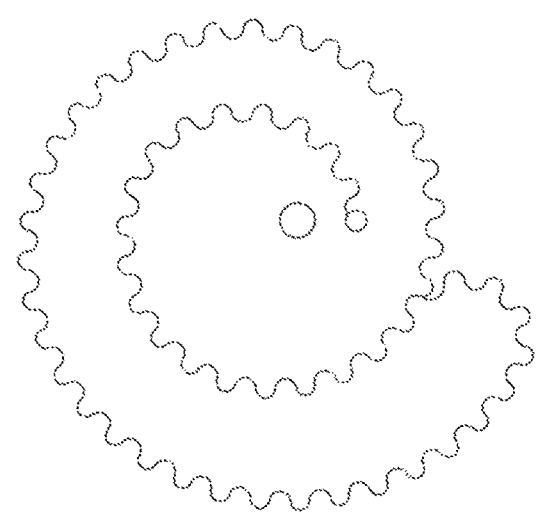
FIG. 7 is a front view of an alternative embodiment of the present invention.

A fishing line or wire 9 is passed through the hole 2 in the device and the device rests somewhat perpendicular to the line (FIG. 7). The device is placed in front of a spacer, typically a plastic bead or beads 8. The spacer allows for the device to rotate freely on the line 9.

In this particularly preferred embodiment, the device is configured in such a way that it will rotate in the water at speeds ranging from 0.04 mph to 3.0 mph. The device rotates (FIG. 4) because of the planar deflection due to the cut causing the material of the device to be pushed backwards from the resistance of the water. The faster the device is pulled through the water, the more planar deflection in the material and the greater the rotation speed.

The fishing line 9 can be fed through the hole 2 from the front or the back of the device. Depending on the fed direction of the fishing line, a reversal in the direction of rotation from clockwise to counter clockwise can be achieved.

The device of the subject invention allows a fisherman to create the needed action in his lure to attract fish. This needed action is created by a planar deflection of the device creating a rotation of the device as it is pulled through the water at a variety of speeds. This rotation creates the needed action and flash to attract fish to the fisherman's lure.

It is understood that the foregoing examples are merely illustrative of the present invention. Certain modifications of the articles and/or methods may be made and still achieve the objectives of the invention. Such modifications are contemplated as within the scope of the claimed invention.

The invention claimed is:

1. A device having a planar shape and being capable of planar deflection when pulled through water, the device comprising:

a planar member having a circular shape, front and back sides, a center, and a peripheral edge;

a spiral shaped cut that begins at the peripheral edge and follows a circumference of the circular shape a set distance from the peripheral edge and which extends inwardly along a length thereof toward the center of the planar member and terminating at a first hole located interiorly of the planar member with respect to the peripheral edge, wherein the cut forms;

an elongation of the planar shape occurs while being pulled through the water in use; and a second hole offset and spaced from the first hole which is large enough to allow a fishing line or wire to pass therethrough, the second hole being larger in size than the first hole, and the first and second holes being offset from the center of the planar member allowing the device to rotate.

* * * * *